(No Model.)

W. J. JOHNSON.
Strainer for Tea and Coffee Pots.

No. 234,712. Patented Nov. 23, 1880.

Witnesses.

Inventor.
William J. Johnson

UNITED STATES PATENT OFFICE.

WILLIAM J. JOHNSON, OF NEWTON, ASSIGNOR TO NATIONAL MANUFACTURING COMPANY, OF BOSTON, MASSACHUSETTS.

STRAINER FOR TEA AND COFFEE POTS.

SPECIFICATION forming part of Letters Patent No. 234,712, dated November 23, 1880.

Application filed October 9, 1880. (No model.)

*To all whom it may concern:*

Be it known that I, WILLIAM J. JOHNSON, of Newton, Massachusetts, have invented a new and useful Strainer for Tea and Coffee Pots; and I hereby declare that the following specification is a full, clear, and exact description of the same, and the accompanying drawings an illustration thereof.

This invention is in the nature of an improvement upon the ordinary strainer suspended by a wire bail from a spring-wire entering the spout of a tea or coffee pot. A serious difficulty with said strainers has resulted from the manner of uniting the bail to the suspending-wire by forming a loop at the center of the bail which engages with an eye at the extremity of the spring-wire. Such union is not like a hinge, giving the parts motion relatively in one direction only or around an axis; but it permits the strainer to swing loosely in every direction, and frequently to get into such position that on pouring the liquid through the spout it passes one side of the strainer instead of through it, or it strikes the bail thereof, causing a disagreeable spattering of the liquid.

The object of my improvement is to remedy this; and my invention is embodied in a strainer whose bail and suspending-wire are united by a double bearing or hinge-joint, giving freedom of movement in the necessary direction and preventing lateral or other injurious movement of the parts.

Figure 1:
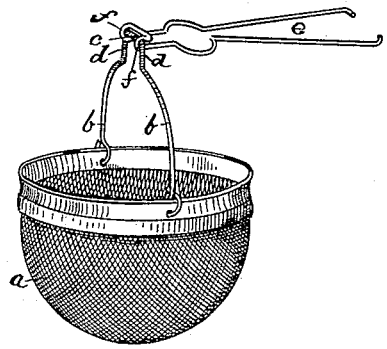
Figure 2:
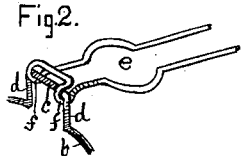
Figure 3:
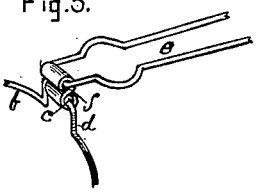
Figure 4:
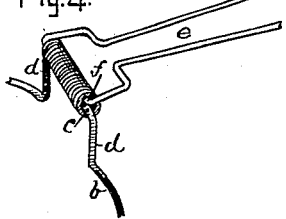

In the drawings, Figure 1 represents my improved strainer in position for use. Fig. 2 is an enlarged view of the hinge-connection. Figs. 3 and 4 are modifications thereof.

The strainer $a$ is a gauze basket made in the usual manner. Its bail $b$ has at its center a straight horizontal portion, $c$, and at each side thereof a vertical shoulder, $d$. The continuous suspending-wire $e$ is bent to correspond therewith and to form two bearings, $f$, for the part $c$, one adjoining each shoulder $d$.

This construction gives a regular hinge action and prevents the loose indiscriminate swinging of the parts which characterizes the old form. When the arms $e$ of the suspending-wire enter the spout side by side, so as to bring the axis of the hinge into a horizontal plane, the strainer will swing freely on its bearings, and will be free from the objections above stated.

In the modification, Fig. 3, the bearings of the bail and supporting-wire are united by an S-shaped piece of metal, while in Fig. 4 a tube or wire coil serves the same purpose.

I claim as my invention—

1. A strainer having a wire bail and a wire support therefor formed with a broad bearing, serving as a hinge-joint, substantially as and for the purposes set forth.

2. A strainer having a wire-bail with shoulders $d\ d$ and intermediate part, $c$, in combination with a wire support formed with bearings $f\ f$, for the purpose set forth.

WILLIAM J. JOHNSON.

Witnesses:
A. H. SPENCER,
J. O. BISHOP.